United States Patent [19]

Nagase et al.

[11] Patent Number: 5,583,295
[45] Date of Patent: Dec. 10, 1996

[54] PRESSURE SENSOR HAVING GAUGE RESISTORS AND TEMPERATURE COMPENSATING RESISTORS ON THE SAME SURFACE

[75] Inventors: Kazuyoshi Nagase, Nukata-gun; Seiichirou Otake, Hazu-gun; Shinji Ozaki, Toyohashi, all of Japan

[73] Assignee: Nippondenso Co., Ltd., Kariya, Japan

[21] Appl. No.: 404,289

[22] Filed: Mar. 14, 1995

[30] Foreign Application Priority Data

Mar. 14, 1994 [JP] Japan .................................. 6-042472
Mar. 14, 1994 [JP] Japan .................................. 6-042473

[51] Int. Cl.⁶ .................................................. G01L 19/04
[52] U.S. Cl. ........................... 73/708; 73/721; 73/727; 73/115
[58] Field of Search .......................... 73/754, 756, 708, 73/744, 745, 721, 727, 862.623, 862.68, 115

[56] References Cited

U.S. PATENT DOCUMENTS

| 3,736,436 | 5/1973 | Crites | 307/88 |
|---|---|---|---|
| 3,772,628 | 11/1973 | Underwood et al. | 338/2 |
| 4,173,900 | 11/1979 | Tanabe et al. | 73/727 |
| 4,829,814 | 5/1989 | Suzuki et al. | 73/118.2 |
| 4,833,929 | 5/1989 | Omura et al. | 73/862.68 |
| 4,965,660 | 10/1990 | Ogihara et al. | 357/81 |
| 4,993,266 | 2/1991 | Omura et al. | 73/720 |
| 5,199,303 | 4/1993 | Benedikt et al. | 73/727 |
| 5,249,468 | 10/1993 | Benedikt et al. | 73/706 |
| 5,315,875 | 5/1994 | Benedikt et al. | 73/706 |
| 5,353,633 | 10/1994 | Benedikt et al. | 73/115 |

FOREIGN PATENT DOCUMENTS

| 59-116025 | 7/1984 | Japan . |
|---|---|---|
| 62-140038 | 6/1987 | Japan . |
| 62-204137 | 9/1987 | Japan . |
| 63-122926 | 5/1988 | Japan . |
| 63-148137 | 6/1988 | Japan . |
| 4257272 | 9/1992 | Japan . |
| 4290937 | 10/1992 | Japan . |
| 9201914 | 2/1992 | WIPO . |
| 9215851 | 9/1992 | WIPO . |

OTHER PUBLICATIONS

Ueda, et al: "Combustion Pressure Sensor with Pirzoresistive Silicon Device", Jidoushagijutsukai 924, vol. 3 Oct. 1992, No. 924126: pp. 53–56.

Journal of Nippondenso Technical Disclosure, Sep. 15, 1993, No. 92–220.

*Primary Examiner*—Richard Chilcot
*Assistant Examiner*—Paul D. Amrozowicz
*Attorney, Agent, or Firm*—Cushman, Darby & Cushman; IP Group of Pillsbury; Madison & Sutro LLP

[57] ABSTRACT

A pressure detector comprises a pressure sensitive element composed of a semiconductor substrate having at least four gauge resistances and outputting signal in response to a pressure. A pressure transmission member is provided on the surface having the gauge resistors of the pressure sensitive element, for transmitting the pressure to the pressure sensitive element. Taking a crystal face of (110) as the face orientation of the pressure sensitive element, a bridge circuit is constructed by disposing a pair of gauge resistors in the direction of <110> of the crystal axis, disposing another pair of gauge resistors in the direction of <100> of the crystal axis and by connecting them each other. The bridge circuit is located within a pressurized surface which the pressure transmission member presses. Further, temperature compensating resistors are disposed in the direction of <100> of the crystal axis so as to be located also within the area of the pressurized surface.

14 Claims, 13 Drawing Sheets

PRESSURE SENSOR HAVING GAUGE RESISTORS AND TEMPERATURE COMPENSATING RESISTORS ON THE SAME SURFACE

CROSS REFERENCE TO RELATED APPLICATIONS

This application is based on and claims priority from Japanese Patent Applications No. 6-42472 and No. 6-42473 filed Mar. 14, 1994, the contents of which are incorporated herein by reference.

BACKGROUND OF THE INVENTION

1. Field of the Invention

The present invention relates to a pressure detector utilizing a piezo effect of a semiconductor and in particular to a pressure detector which may be used for detecting combustion gas of an internal combustion engine.

2. Description of the Related Art

Japanese Patent Laid-Open No. 64-36081 discloses one such pressure detector.

Pairs of output and input electrodes are provided to face each other such that they cross at a right angle on a single crystal silicon body having a homogeneous impurity concentration and a thickness cut out so as to have a crystal face of (110) as a face to which a compression force is applied. Then, a seat which can always disperse and transmit the compression force applied perpendicularly to the crystal face is bonded to the crystal face. Further, a support base having sufficient rigidity in the direction where the compression force is generated is bonded to another face of the single crystal silicon body facing to the crystal face. The single crystal silicon body is thus caused to generate only a simple compression force when the compression force acts perpendicularly on the crystal face by bonding it to the support base.

By forming the pressures in this manner, the influence of changes in the resistance value of the strain gauge, which increases with a change in temperature, is is reduced.

Here the single crystal silicon body is constructed as indicated by the reference numeral 62 shown in FIG. 24 and a $\pi'_{63}$ gauge is used which generates a potential between output electrodes 64a and 64b disposed in the y-direction which cross with input electrodes 63a and 63b when a current is applied in the x-direction from the input electrodes 63a and 63b and a compressive force is applied in the z-direction. The reference numeral 65 denotes a pressurized surface where the seat pressurizes the crystal face.

It is to be noted that because normally a planar technology by means of patterning using a mask is implemented when the electrodes are formed, a certain degree of electrode width W is formed as shown in FIG. 24. Further, because the electrodes are formed from a metal such as Al, the resistance within the electrode is very small.

Another pressure detector of this sort shown in FIG. 25 is disclosed in Nippondenso Technical Disclosure No. 92 -220.

In FIG. 25, a cup 69 having a metal diaphragm portion 68 is provided at an opening on the side of distal end of a housing (case) 67 having a screw section 66. Provided within it is a support base 71 for holding leads by hermetically sealing them. A pressure sensitive element 72 on which a gauge resistor (not shown) is formed is provided on the support base 71 and a rod 73 having a globular or circular top face for transmitting a load is provided further on the element 72. A heat radiating agent 74 is provided under the support base 71. Because the apparatus is connected to an engine block (not shown) by the screw section 66, the support base 71 electrically conducts with the engine block and becomes a ground.

A gap between the rod 73 and the pressure sensitive element 72 and that between the pressure sensitive element 72 and the support base 71 are bonded by an insulating adhesive 75. Each gap is thus insulated by an insulating adhesive layer made from the adhesive 75.

A gap between the pressure sensitive element 72 and the lead 70 is electrically connected by a bonding wire 76.

According to the pressure detector constructed as described above, pressure applied to the diaphragm portion 68 is led to the pressure sensitive element 72 via the rod 73 and is detected by a piezoresistive effect caused in the gauge resistor on the pressure sensitive element 72.

According to the pressure detector disclosed in Japanese Patent Laid-open No. 64-36081 described above, however, a dislocation of the seat is brought about more or less when it is bonded to the crystal face in reality and there is a problem that the coordinate of the position collapses and the sensitivity drops at that time since the gauge resistor is disposed on the whole surface of the single crystal silicon body 62 and the pressurized surface 65 on the surface, i.e. the surface on which the compression force acts, is pressed by the seat in the prior art structure.

There is also another problem that since the gauge area is larger than the pressurized surface 65, a temperature difference is brought about between the pressurized surface 65 right below the seat and other areas than that by heat from the seat when used in an internal combustion engine and that the temperature characteristics vary, especially when the seat is dislocated from the pressurized surface 65 as described above.

Furthermore, because the single crystal silicon body 62 is constructed to detect a potential by one gauge resistor, the resistance within the electrode becomes very small and the potentials become almost equal in the electrode having the certain degree of electrode width W and made from a metal as described above when the compression force is applied to the crystal face. Accordingly, there is a problem that the potentials specially generated are canceled out, thereby degrading the sensitivity.

Next, in the pressure detector disclosed in the disclosure No. 92-220 described above, because there exists a small irregularity on the surface of the support base 71 as shown in FIG. 26 which is a partially enlarged view of circled portion G in FIG. 25, the support base 71 and the pressure sensitive element 72 may partially contact and conduct. Accordingly, they cannot be sufficiently insulated just by the insulating adhesive layer. In this case, there is a problem that a leak current flows to the case 67 between the case and the gauge resistor due to the non-insulation between the pressure sensitive element 72 and the support base 71, thereby causing unstable characteristics.

Normally, the gauge resistance is of the order of several hundreds ohms to several tens kiloohms and when the gauge resistance is capacity-coupled with the case 67 with a capacity of several tens pF, for example, a high frequency noise of more than several tens MHz is mixed into the gauge output signal, causing erroneous operation of the apparatus. Through the study on the fact that the high frequency noise is mixed into the gauge output signal by the parasitic capacitance, it was found that the parasitic capacitance is generated at three places: the hermetic sealed section of the lead 70, the insulating adhesive layer between the support base 71 and the pressure sensitive element 72 and the insulating adhesive layer between the pressure sensitive element 72 and the rod 73. Further, it was found that the high frequency noise is mixed into the gauge output signal by the capacitance coupling of each, causing erroneous operation of the apparatus.

Accordingly, the prior art structure has the problems in that the high frequency noise mixes into the gauge output signal by the parasitic capacitance at those three places, causing erroneous operation of the apparatus.

As described above, characteristics of these pressure detectors fluctuate, with temperature characteristics due to the dislocation of the seat and the electrode width W. Further, current is prone to leak from the non-insulation between the pressure sensitive element and the support base, and high frequency noise is generated and mixed into the gauge output signal due to the parasitic capacitance generated at the hermetically sealed portion of the lead, in the insulating adhesive layer between the support base and the pressure sensitive element and in the insulating adhesive layer between the pressure sensitive element and the rod.

SUMMARY OF THE INVENTION

Accordingly, it is a primary object of the present invention to solve the aforementioned problems by providing a pressure detector which is able to obtain an accurate temperature characteristic irrespective of the electrode width without degrading the sensitivity even if the surface on which a compression force acts is dislocated. It is a secondary object of the present invention to suppress the characteristics from being fluctuated by the leak current or high frequency noise.

According to one aspect of the present invention, a pressure detector includes a pressure sensitive element having gauge resistors for outputting signals in response to a pressure and a pressure transmission member for transmitting the pressure to the pressure sensitive element. The pressure transmission member is provided on a surface having the gauge resistors of the pressure sensitive element and the gauge resistors are accommodated within a pressurized surface of the pressure sensitive element on which the pressure transmission member presses the pressure sensitive element.

According to another aspect of the present invention, a pressure detector includes a pressure sensitive element formed from a semiconductor substrate having at least four gauge resistors and outputting signals in response to a pressure and, pressure, transmission member for transmitting the pressure to the pressure sensitive element. The pressure transmission member is provided on a surface having the gauge resistors of the pressure sensitive element. Taking (110) face as the face orientation of the pressure sensitive element, a bridge circuit is structured by disposing a pair of gauge resistors in the direction of <110> of the crystal axis, disposing another pair of gauge resistors in the direction of <100> of the crystal axis and by connecting them each other. The bridge circuit is accommodated at least within a pressurized surface of the pressure sensitive element on which the pressure transmission member presses the pressure sensitive element.

Preferably temperature compensating resistors whose resistance values change in response to temperature are further provided in the detector. The temperature compensating resistors are disposed in the direction of <100> of the crystal axis of the semiconductor substrate. The temperature compensating resistors and the bridge circuit are accommodated at least within the pressurized surface on which the pressure transmission member presses the pressure sensitive element and the gauge resistors and temperature compensating resistors are disposed in the center portion of the pressurized surface on the surface of the pressure sensitive element right below the lower end of the pressure transmission member.

According to a further aspect of the present invention, a pressure detector includes a pressure sensitive element having gauge resistors for outputting signals in response to a pressure, a pressure transmission member disposed on a surface having the gauge resistors of the pressure sensitive element for transmitting the pressure to the pressure sensitive element, an electrically conductive stem for attaching the pressure sensitive element and an electrically conductive housing for holding the stem. The gauge resistors are accommodated within a pressurized surface of the pressure sensitive element on which the pressure transmission member presses the pressure sensitive element and the pressure sensitive element is attached to the stem by an insulating adhesive by providing an insulating film on the face opposing the pressurized surface of the pressure sensitive element.

Preferably the gauge resistors are provided on the semiconductor substrate and a signal transmission medium hermetically sealed by inserting to the stem for giving/receiving signals between the pressure sensitive element and the outside are also provided. The signal t0 transmission medium is one in which a gauge output is impedance-converted, an insulating film is provided on the surface facing to the pressurized surface of the pressure sensitive element and the semiconductor substrate is grounded, the pressure sensitive element is attached to the stem by an insulating adhesive, an electrically conductive sealing member is provided on the gauge resistors of the pressure sensitive element via the insulating film and is grounded, and the pressure transmission member is attached to the sealing member by the insulating adhesive.

More preferably the adhesive crawls up to the side of the pressure sensitive element at the lower end face of the pressure sensitive element.

Still more preferably, the gauge resistors described are disposed in the center portion of the pressurized surface on the surface of the pressure sensitive element right below the lower end of the pressure transmission member.

Thus, in the present invention, the pressure is transmitted to the gauge resistors on the pressure sensitive element via the pressure transmission member. Then, when the pressure is transmitted to the gauge resistors, the pressure sensitive element outputs signals in response to the pressure. Here, because the gauge resistors are accommodated within the pressurized surface of the pressure sensitive element on which the pressure transmission member presses the pressure sensitive element, the temperature compensating resistors are also accommodated within the pressurized surface and those gauge resistors and temperature compensating resistors are disposed at the center portion of the pressurized surface on the surface of the pressure sensitive element right below the lower end of the pressure transmission member, the gauge resistors and temperature compensating resistors will not deviate from the pressurized surface of the pressure transmission member even if the surface on which the compression force acts is dislocated. Furthermore, because both the gauge resistors and temperature compensating resistors are located right below the lower end of the pressure transmission member, the temperature of the gauge resistors and temperature compensating resistors becomes equal. Accordingly, the sensitivity does not drop and accurate temperature characteristics may be obtained.

Furthermore, because the gap between the pressure sensitive element and the stem is completely insulated and a leak current which might be generated at this portion is blocked, the high frequency noise is prevented from mixing in by the parasitic capacitance generated in the hermetically sealed portion, in the insulating adhesive layer between the stem and the pressure sensitive element and in the insulating adhesive layer between the pressure sensitive element and the pressure transmission member, the sensitivity becomes better and accurate temperature characteristics may be obtained.

The above and other advantages of the present invention will become more apparent in the following description and the accompanying drawings in which like numerals refer to like parts.

BRIEF DESCRIPTION OF THE DRAWINGS

In the accompanying drawings:

FIGS. 7(a)–7(d) are diagrams showing a manufacturing process of the semiconductor device of the present invention, wherein FIG. 7(a) shows a process of forming surface gauges, FIG. 7(b) shows a process polishing the backside, FIG. 7(c) shows a process of forming an insulating film and FIG. 7(d) shows a process of cutting the device;

FIGS. 18(a) and 18(b) are diagram showing states of the compression force right below the outer periphery of the rod, wherein FIG. 18(a) shows a case when there is no buffer layer and FIG. 18(b) shows a case when there is a buffer layer;

DETAILED DESCRIPTION OF THE PREFERRED EMBODIMENTS

Preferred embodiments of the presents invention will be explained.

Figure 1:
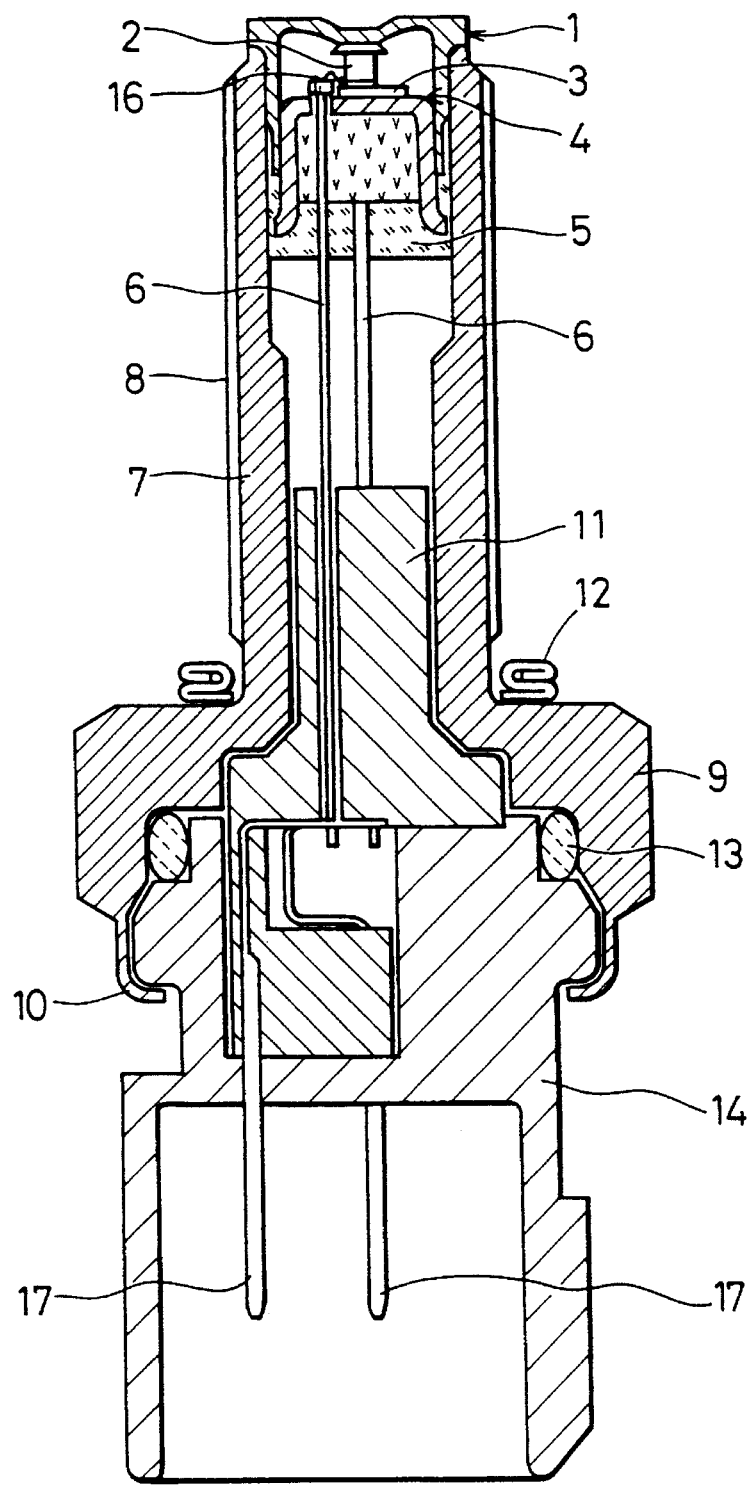
FIG. 1 is a schematic sectional view of the entire pressure detector of the present invention.

FIG. 1 is a sectional view schematically showing the whole exemplary pressure detector of the present invention which may be attached within an engine block of an internal combustion engine (not shown).

The pressure detector of FIG. 1 has a cylindrical housing 7 formed from stainless steel (hereinafter abbreviated as SUS) with both ends are open. Threads 8 are formed on the outer peripheral surface of the housing 7 to be screwed in a screw hole (not shown) provided in a cylinder head (not shown) of the engine block to electrically conduct the housing 7 with the engine block and to release heat to outside through the contact with the threads 8. At this time, a gasket 12 as a sealing ring is pressed to the outer face of the cylinder head between a hexagon section 9 of the housing and the engine block to seal gas.

An O-ring 13 is provided at a predetermined location of a case 14 to seal the device rendering it waterproof and a spacer 11 for securing the insulation between the leads 6 and the housing 7 is provided within the housing 7. When the case 14 is crimped holding the spacer 11 within the housing 7 by a crimped section 10 of the housing 7, the O-ring 13 is secured.

Figure 2:
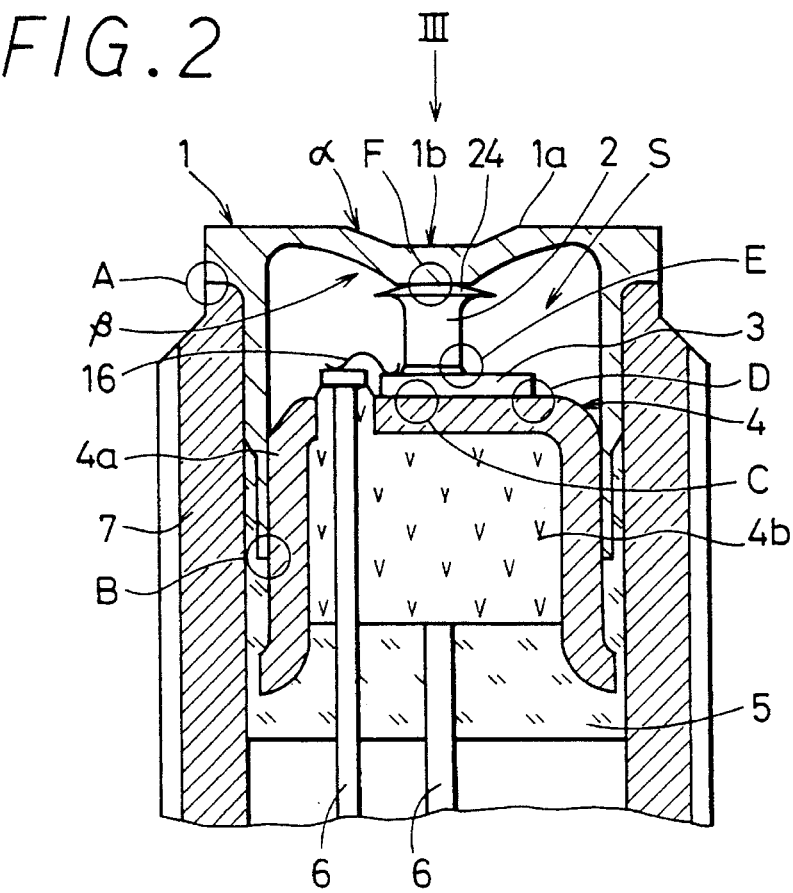
FIG. 2 is an enlarged sectional view of the main part of a top section of a housing of the present invention.

An opening section on the top side of the distal end (the side of combustion chamber) of the housing 7 is constructed as shown in FIG. 2, which shows an enlarged view of the main part thereof. A thin cup 1 is pressed therein and an outer periphery of the bottom thereof (portion A in the figure) is welded to the end of the housing 7 to seal the opening section from the combustion chamber and to electrically connect the cup 1 and the housing 7. At this time, the disc-like bottom section of the cup 1 receives a pressure and the pressure received by it is transmitted to a load transmission rod 2 as a member for transmitting the pressure. That is, because the pressure receiving section functions as a diaphragm, it will be referred to as a diaphragm portion 1a hereinafter. It is preferable to form the cup 1 having such diaphragm portion 1a by a material having an excellent resiliency, corrosion resistance and heat resistance such as a high heat resistant SUS.

At the center portion of the pressure receiving surface of the diaphragm portion 1a which directly receives combustion gas, a concave crater or recessed section 1b is provided in such a manner that the radial center portion thereof is indented toward a semiconductor 3 in the axial direction, i.e. it is dropped toward the opposite side from the combustion chamber as compared to the outer periphery of the diaphragm portion 1a, to reduce a thermal output during combustion. Inserted into the opening section of the cup 1 on the opposite side from the diaphragm portion 1a is a stem 4 in which a cup shaped eyelet 4a and leads 6 are fixed by an insulating member 4b composed of glass or the like and which is welded with the cup 1 at portion B in the figure to electrically conduct the diaphragm portion 1a and the stem 4. Accordingly, the stem 4 conducts with the engine block by the welds at portions A and portions B described above and becomes a ground.

Figure 3:
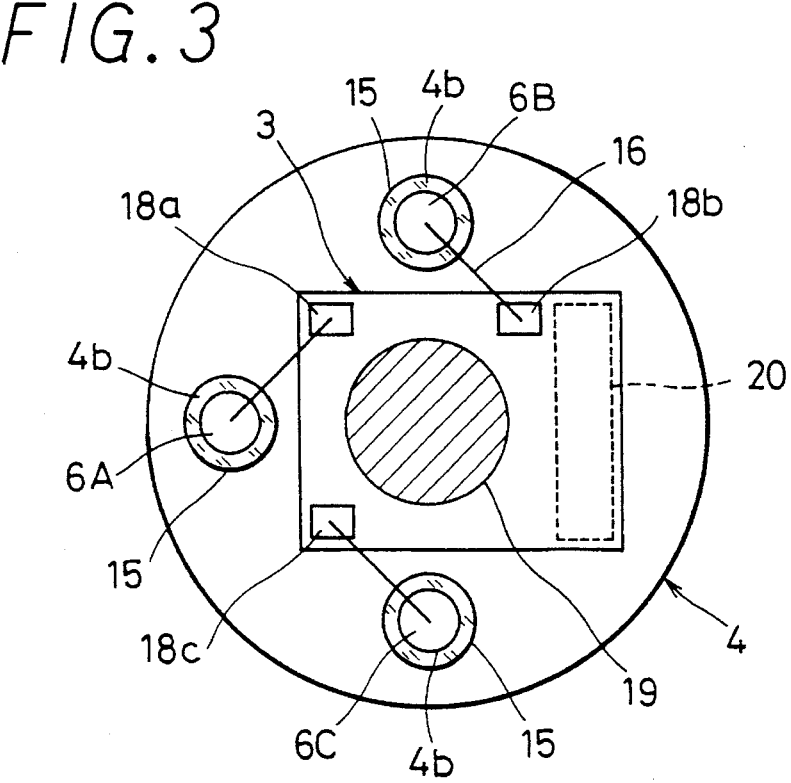
FIG. 3 is an enlarged plan view showing a main part of a stem of the present invention.

A plane of the stem 4 (surface seen from the direction III in FIG. 2) is configured as shown in FIG. 3, which shows an enlarged view of the main part thereof. Plurality of small holes 15 are provided on the stem 4 in the axial direction. The electrical leads 6A, 6B and 6C made from metallic electrode rods as a predetermined number of (shown three here) signal transmission media are inserted in these small holes 15 and are hermetically sealed by an insulating member 4b. Thereby, the opening section of the cup 1 becomes a sealed space S by the stem 4. The semiconductor 3 is bonded approximately at the center portion of the stem 4 facing to the sealed space S as a signal processing circuit integrated pressure sensitive element by an electrically insulating adhesive 22 which will be described later. The electrically insulating adhesive 22 functions as a buffer of thermal stress. The semiconductor 3 and one end of the leads 6A, 6B and 6C are electrically connected by bonding wires 16 via Al electrode pads 18a, 18b and 18c and the other ends thereof are connected to leads 17 for connection within the case 14 to allow electrical signals to be communicated between the semiconductor device 3 and external components as shown in FIG. 1.

An electrical insulating heat radiating agent 5 such as Si gel is formed in the bottom of the stem 44 for releasing heat transmitted from the load transmission rod 2 to the semiconductor device 3 effectively through the housing 7.

While gauge resistors and aluminum electrodes are formed on the semiconductor device 3, their resistance values change due to their piezoresistive effect when a pressure transmitted from the load transmission rod 2 is applied thereto and the changes of the resistance values are output as an electrical change, as described later.

As shown in FIG. 3, three Al electrode pads 18a, 18b and 18c, a gauge section 19 which bridges piezoresistive elements as the gauge resistors whose resistance value changes in response to a compression force and which functions as a pressurized surface through which the load transmission rod 2 transmits the pressure to the piezoresistive elements, and an amplifier circuit 20 for amplifying the bridge output (described later) are provided on the surface of the semiconductor device. In the Transistors, diodes, capacitors and resistors are normally formed in the amplifier section 20 and integrated. The three Al electrode pads 18a, 18b and 18c are electrode pads for a power source of 5 V (volts) for example, for grounding (referred to as GAD hereinafter) and for output, respectively.

Figure 4:
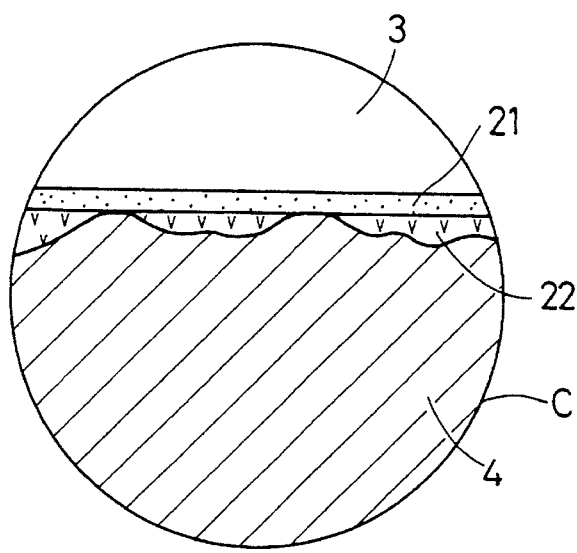
FIG. 4 is a partially enlarged view showing a bonded state of a semiconductor device with the stem of the present invention.

On the back of the semiconductor device 3 on the other hand, the semiconductor device 3 is bonded to the stem 4 by the electrically insulating adhesive 22 while maintaining a contact-insulation with the stem 4 by being covered by an electrically insulating film 21 such as Si—N film as shown in circled portion C in FIG. 2 or in FIG. 4 which is a partially enlarged view showing the bonded state of the semiconductor device 3 and the stem 4. Here, according to the present embodiment, the pre-hardening viscosity of the electrically insulating adhesive 22 is lowered in bonding as described above, so that the lower end face of the semiconductor device 3 at the interface thereof with the stem 4 is reliably coated by the electrically insulating adhesive 22 by the crawled-up portion thereof and a leak current at the interface may be prevented from flowing. It is to be noted that it is effective to use a metal such as cobalt as the eyelet 4a to match its coefficient of thermal expansion with that of Si.

Figure 6:
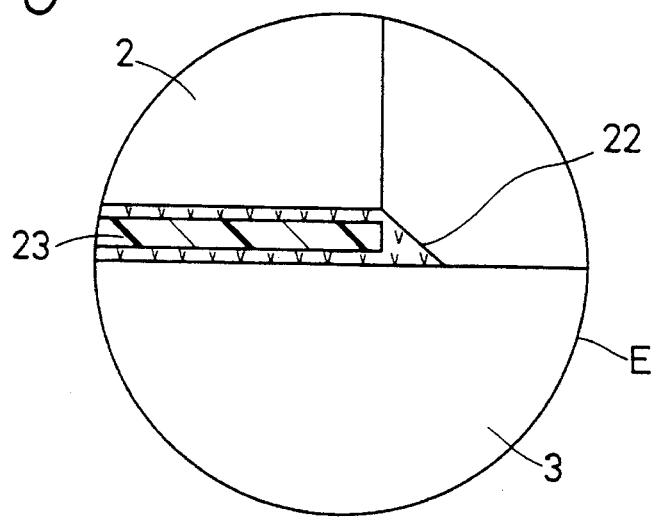
FIG. 6 is a partially enlarged view showing a bonded state of end faces of a load transmission load and of the semiconductor device of the present invention.
Figure 7A:
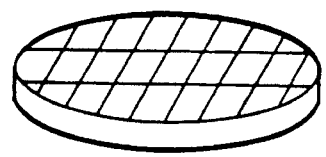
Figure 7B:
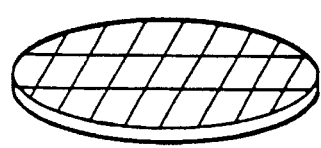
Figures 7C, 7D:
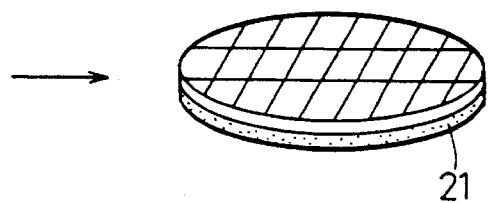

In bonding the load transmission rod 2 and the semiconductor device 3, an electrically insulating film 23 as a buffer is interposed so that the load transmission rod 2 is disposed right above the gauge section 19 and to form buffer layers created using the electrically insulating adhesive 22 to bond the load transmission rod 2 and the semiconductor device 3 as shown in FIG. 6, which is a partially enlarged view of circled portion E in FIG. 2. Here, the load transmission rod 2 is made from a metal or ceramic having a large elastic modulus (Young's modulus) to increase a load transmission efficiency, and has an effect of transmitting the pressure transmitted from the diaphragm portion 1a to the semiconductor device 3. Note that it is effective to use ceramics for the load transmission rod 2 when a temperature of the measured ambience is high, because thermal conductivity of ceramics is small as compared to metals. Therefore, the ceramic can serve to block heat from flowing from the diaphragm portion 1a to the semiconductor device 3 and has a large effect of preventing the temperature rise of the semiconductor device 3. A distal end portion 24 of the load transmission rod 2 is formed globularly or circularly as shown in FIG. 2 and is constructed so as to form a point-contact with the center of the convex of the crater portion 1b of the diaphragm portion 1a, i.e. with the center of the bottom thereof, and so that a force transmitted from the combustion chamber via the diaphragm portion 1a always acts on the axial center of the load transmission rod 2.

The globular point contact is adopted to prevent an unbalanced load from being applied to the gauge section 19 of the semiconductor device 3 when the load transmission rod 2 is assembled and to always transmit a homogeneous compression force to the gauge section 19, and to minimize the amount of heat flowing from the diaphragm portion 1a to the semiconductor device 3.

It is to be noted that for the film 23, resin, glass or the like having a smaller elastic modules and lower thermal conductivity than the load transmission rod 2 is used to homogenize the compression force to the gauge section 19 of the semiconductor device 3 and to prevent the temperature from increasing. However, it is not always necessary to use the film 23 so long as the effects of relaxing the concentration of stress and of preventing the increase of temperature are obtained. An adhesive containing fillers, for example, also be used, of course, as described later.

Next, the semiconductor device 3 will be explained with reference to FIGS. 7 through 10.

The semiconductor 3 is formed by the known manufacturing process as shown in FIGS. 7(a)–7(d). That is, gauges are formed on the surface of a Si wafer in the process shown in FIG. 7(a). Next, the back of the wafer is polished in the process shown in FIG. 7(b) and then an electrically insulating film 21 such as SiN film or $SiO_2$ film is formed in the process shown in FIG. 7(c). Finally, the wafer is cut into gauge chips to obtain the semiconductor device 3 in the process shown in FIG. 7(d).

Figure 8:
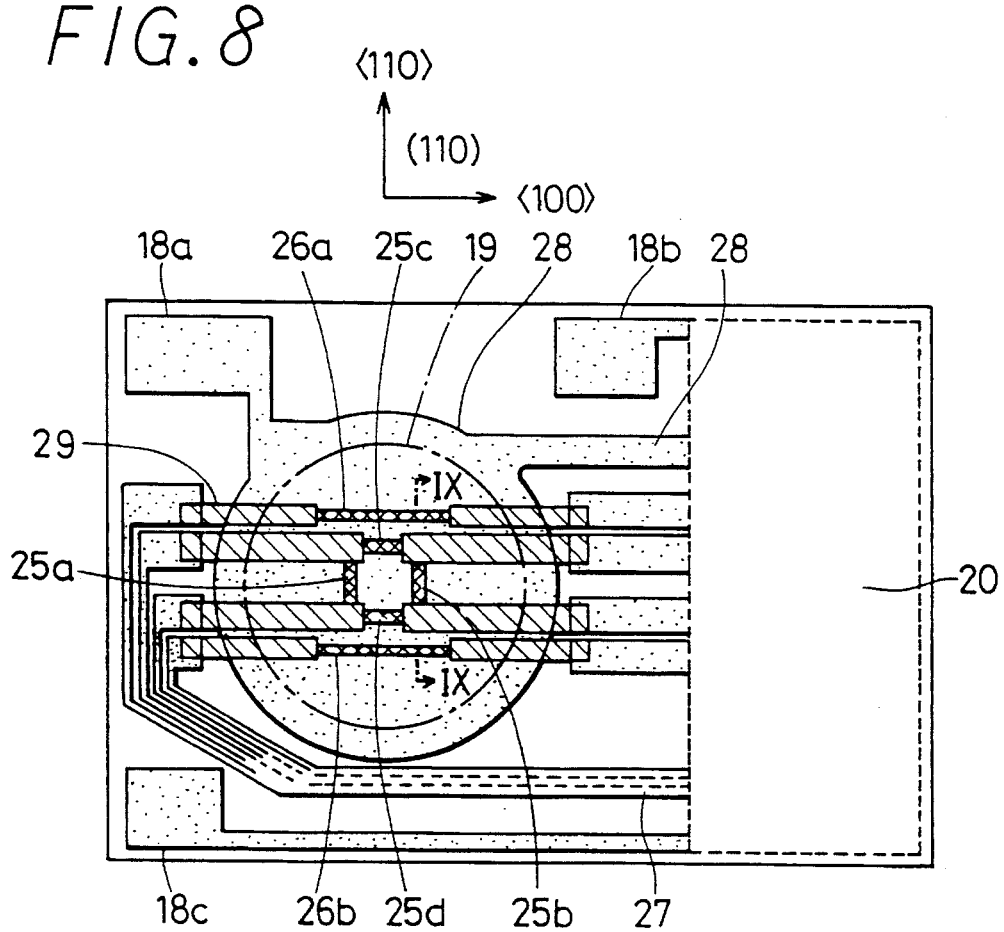
FIG. 8 is an enlarged plan view of a plane of the semiconductor device of the present invention.
Figure 10:
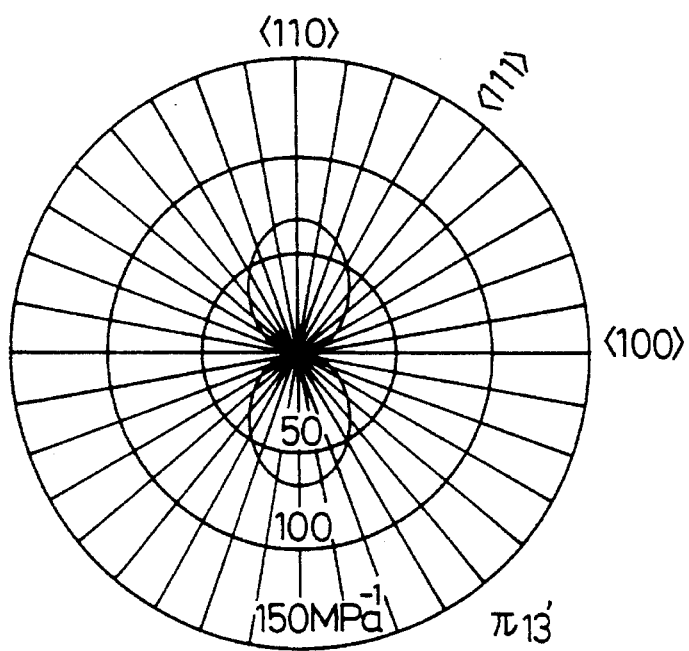
FIG. 10 is a diagram showing variations of resistances against a compression force on the face of (110) of P-type Si.

The plane of the semiconductor device 3 formed through such manufacturing process is configured as shown in an enlarged view in FIG. 8. In FIG. 8, a face in the direction of (110) of the Si substrate is used and a bridge circuit is formed by four piezoresistive elements 25a, 25b, 25c and 25d. Among them, a pair of piezoresistive elements 25a and 25b are disposed so that a current flows in the direction of <110> and its resistance value increases in response to a compression force by the piezoresistive effect. The remaining pair of piezoresistive elements 25c and 25d is disposed in the direction of <100> and its resistance value do not change in response to the compression force. This phenomenon is caused by the crystal anisotropy of Si and it is generally known to be manifested as shown in FIG. 10, wherein the variation of resistance values to the compression force on the P-type Si (110) face is indicated in each direction.

Bridge resistors 25a through 25d are disposed on the gauge section 19 as to be always accommodated within the range of the lower end of the load transmission rod 2 even when the load transmission rod 2 is dislocated during assembly by sufficiently reducing its size. The bridge resistors 25a through 25d are connected to an Al wire 27 on the outside of the load transmission rod 2 to lead an output signal generated by the piezoresistive effect to the amplifier circuit 20. Thereby, the sensitivity may be increased and dispersion of the sensitivity may be reduced. Furthermore, because any line width or length of bridge resistor may be adopted within the range accommodated in the lower end of the load transmission rod 2, the degree of freedom of selection of the resistance value may be increased.

Because resistors 26a and 26b for compensating temperature of the bridge are disposed similarly within the range of the lower end of the load transmission rod 2, their temperature becomes almost equal to that of the bridge resistors 25a through 25d and the accuracy may be improved as compared to a case when they are disposed at another location.

It is to be noted that resistors 26a and 26b are connected to low seat resistance layers 29, avoiding a sealing film 28 made from a sealing member as an Al shielding area, and that they are wired from the area where the gauge section 19 is provided at the lower end of the load transmission rod 2 to another area by the Al wire 27.

Next, a sectional structure of the semiconductor device 3, including the bonded state of the load transmission rod 2 and the stem 4, will be explained with reference to FIG. 9.

Figure 9:
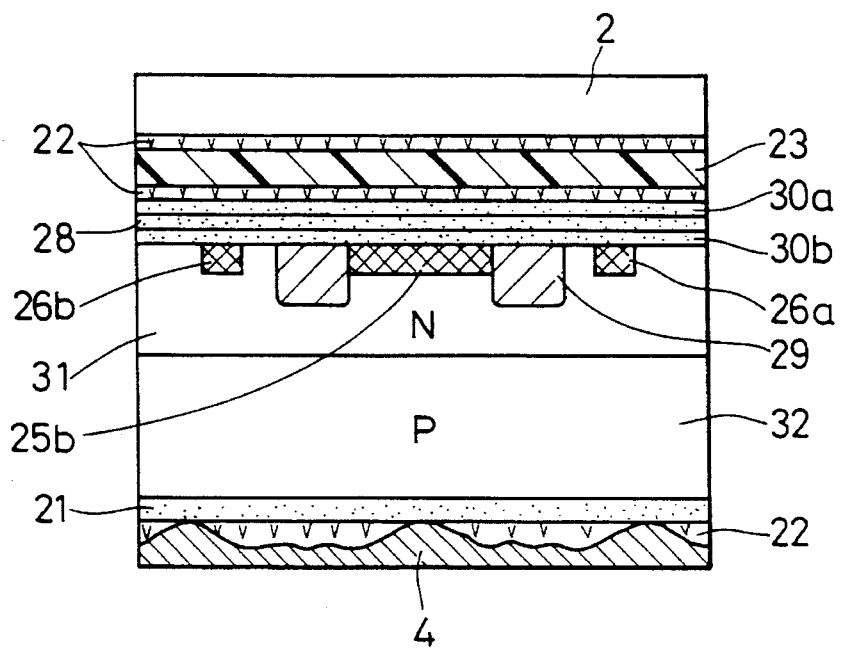
FIG. 9 is an enlarged view showing a main part of a section along the line IX—IX in FIG. 8 and showing a bonded state of the load transmission rod and the stem of the present invention.

FIG. 9 is an enlarged view showing a section along IX—IX in FIG. 8 and showing the bonded state of the load transmission rod 2 and the stem 4. In FIG. 9, a sealing film 28 is formed on the piezoresistive element 25b constructed on the gauge section 19 through an intermediary of an insulating film 30b. The sealing film 28 is connected to the GAD electrode 18a shown in FIG. 8 and blocks a high frequency noise (10 MHz to 10 GHz: hereinafter abbreviated as noise) from the load transmission rod 2. Then, an insulating film 30a is formed on the sealing film 28 and the load transmission rod 2 is bonded thereon through the intermediary of the film 23 by the electrically insulating adhesive 22.

An N-type resistance island 31 is formed below the piezoresistive element 25b and is given a supply potential. Below that, on a P-type Si substrate 32 is provided which is given with the GAD potential. The electrically insulating film 21 is formed on the back of the substrate 32, which is bonded to the stem 4 by the electrically insulating adhesive 22.

Each resistance value of output terminals I and J of the bridges of such semiconductor 3 (shown in FIG. 20 described later) is preset as $R_{25a}=R_{25b}<R_{25c}=R_{25d}$ so that bridge outputs $V_I$ and $V_J$ become $V_{I>VI}$. In this state, the preset load is applied to the semiconductor device 3 to increase $R_{25a}$ and $R_{25b}$ when the stem 4 is welded with the cup 1 at the portion B in FIG. 2 in the present embodiment, so that the stem 4 and the cup 1 are assembled with a load value of $V_I=V_J$ per product. Thus the dispersion of the bridge outputs $V_I$ and $V_J$ is adjusted when assembled. Thereby, it becomes unnecessary to make an offset adjustment separately or to use an AC coupling circuit (not shown). Note that $R_{25a}$, $R_{25b}$, $R_{25c}$ and $R_{25d}$ are resistances of the piezoresistive elements 25a through 25d, respectively.

Concerning a manufacturing method of the piezoresistive elements 25a through 25d, since they are fabricated by the manufacturing technology as described in Japanese Patent Laid-Open No. 4-257272 which the present applicant has already applied and since other transistors and resistors are fabricated by a known bipolar fabrication process, a detailed explanation is omitted here.

In the pressure detector of the present invention constructed as described above, the concave crater section 1b is provided at the center of the diaphragm portion 1a formed at the disc-like bottom of the cup 1.

The operation and effect of the crater portion 1b will now be explained further.

Because the crater portion 1b is catered toward the semiconductor device 3 as shown in FIG. 2, a temperature difference between the surface (to which measured pressure acts) α of the diaphragm portion 1a and the opposite surface β increases and the surface α tries to extend relatively as compared to the surface β. As a result, even if the radial center portion of the diaphragm portion 1a tends to expand in the axial direction toward the combustion chamber, it becomes hard for the diaphragm portion 1a to dislocate toward the surface α in the axial direction because the slope of the crater portion 1b extends in the opposite direction.

Figure 11:
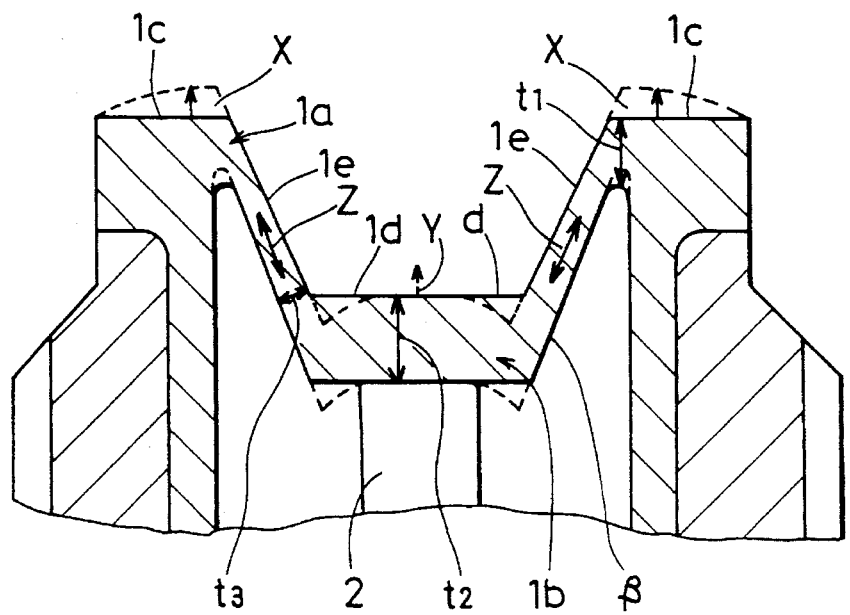
FIG. 11 is an enlarged sectional view showing a main part of a diaphragm portion of the present invention.

This mechanism will be explained in more detail with reference to FIG. 11. FIG. 11 is an enlarged sectional view of the main part of the diaphragm portion 1a of the present embodiment and that the surrounding portion of the crater portion 1b is exaggerated to show its operational effect clearly. In the figure, the reference numeral 1c denotes a flat portion at the top of the diaphragm portion 1a on the side of the surface α, 1d denotes a flat portion at the bottom of the crater portion 1b on the side of the surface α, and 1e a slope portion formed in a taper shape so as to hold the top flat portion 1c and the bottom flat portion 1d of the crater portion 1b on the side of the surface α. A thickness $t_1$ of the top flat portion 1c, thickness $t_2$ of the bottom flat portion 1d and thickness $t_3$ of the slope portion 1e have a relationship of $t_3 \leq t_1$ and $t_2 \leq t_2$.

If the temperature difference between the surfaces α and β increases and the surface α of the diaphragm portion 1a tends to extend relatively to the surface β, the following actions are brought about on the diaphragm portion 1a. That is, the top flat portion 1c tends to extend as if it expands in the X direction shown by the arrow of solid line (upper direction in the figure). Then, similarly, the bottom flat portion 1d also tries to extend as if it expands in the Y direction shown by the arrow of broken line (upper direction in the figure). However, because an extension Z in the longitudinal direction of the slope portion 1e (direction Z shown by the arrows of solid line in the figure) so acts as to absorb the extension Y of the bottom flat portion 1d, the displacement around the radial center portion of the bottom flat portion 1d (expansion toward the combustion chamber in the axial direction) is eliminated. This happens because the extension Z becomes larger than the extensions X and Y because the thickness $t_3$ of the slope portion 1e is smaller than the thickness $t_1$ and $t_2$ of each of the top flat portions 1c and 1d. The displacement of the diaphragm portion 1a is brought about in this state assuming a shape as shown by broken line in FIG. 11.

Accordingly, the load transmission rod 2 is held at the center of the diaphragm portion 1a where there is less displacement due to the temperature difference between the surfaces $\alpha$ and $\beta$ in the present embodiment, even if the temperature difference between the surfaces $\alpha$ and $\beta$ fluctuates due to changes of combustion cycle, rotational speed and adhesion of soot on the surface $\alpha$, the load transmission rod 2 is barely influenced by the fluctuation and the measuring accuracy is improved since a pressure is transmitted to the pressure sensitive element 3 via such load transmission rod 2.

The crater portion 1b of the present embodiment is formed so that it becomes symmetrical to the center axis of the diaphragm portion 1a in order to bring the operational effect of the diaphragm portion 1a described above into full play.

Figure 12:
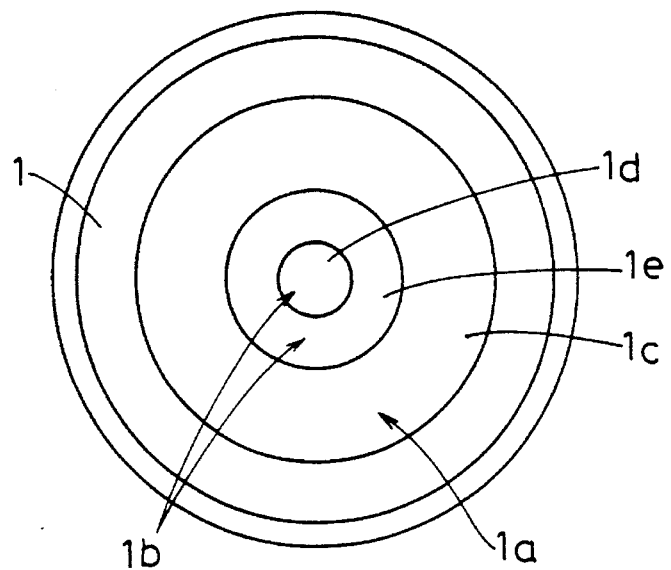
FIG. 12 is a plan view showing the main part of the diaphragm portion in FIG. 11.

While the plane shape of the diaphragm portion 1a is formed into a circular shape as shown in FIG. 12, it is not necessary to maintain a circular shape as long as the crater portion 1b is symmetrical to the center axis of the diaphragm portion 1a and the same effect with the present embodiment may be obtained by a square shape or star shape. FIG. 12 is a plan view seen from the upper direction in FIG. 11 and the housing hexagon section and others are omitted for brevity.

Figure 13:
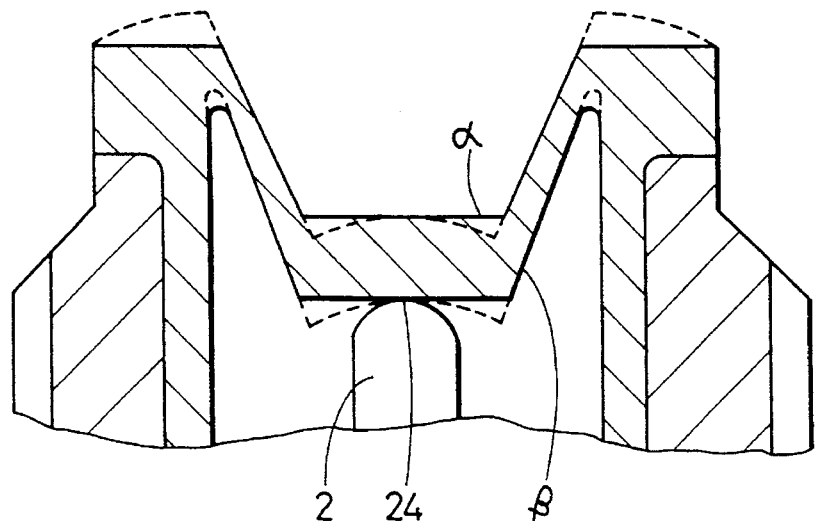
FIG. 13 is an enlarged sectional view showing a main part of another diaphragm portion.

The influence of the fluctuation of the temperature difference between the surfaces $\alpha$ and $\beta$ may be suppressed further by disposing the load transmission rod 2 approximately at the center of the flat portion of the crater portion 1b on the surface $\beta$ where the influence due to the fluctuation becomes the smallest and by forming the distal end portion 24 into a globular shape, for example, so that it point-contacts with the crater portion 1b as shown in FIG. 13 similarly to the present embodiment. That is, the distal end portion 24 of the load transmission rod 2 need not be globular and any shape may be adopted so long as it point-contacts approximately with the center of the flat portion of the crater portion 1b on the side of the surface $\beta$ and can transmit a pressure to the pressure sensitive element 3.

Another embodiment which allows a reduction in the fluctuation of deflection between the both surfaces $\alpha$ and $\beta$ without providing the crater portion 1b in the diaphragm portion 1a will be explained with reference to FIG. 14.

In this pressure detector, while the radial center portion of the diaphragm portion 1a itself is not cratered toward the semiconductor device 3 in the axial direction, i.e. no crater portion 1b is formed, a column 34 having a small diameter is provided axially at the radial center portion on the side of the surface $\alpha$ of a diaphragm portion 33 and a heat blocking shade plate 35 formed by a disc is disposed at the top of the column 34 in parallel to the diaphragm portion 33. The column 34 and the heat blocking shade plate 35 are formed monolithically with the diaphragm portion 33.

By constructing as described above, radiating heat energy radiated from combustion gas is blocked from being received by the diaphragm portion 33. As a result, the changes of temperature of the surface $\alpha$ of the diaphragm portion 33 due to the fluctuation of temperature of the combustion gas caused by the fluctuation of various engine operating conditions are reduced. The reduction of the temperature change reduces the fluctuation of the deflection of the diaphragm portion 33 and reduces the output error of the semiconductor device 3.

Still another embodiment will be explained with reference to FIG. 15.

In this pressure detector, the radial center portion of a diaphragm portion 36 itself is catered toward the semiconductor device 3 in the axial direction similarly to the diaphragm portion 1a shown in FIG. 2. In the present embodiment, a column 37 having a small diameter is additionally implanted at the radial center portion of the diaphragm portion 36 on the side of the surface $\alpha$ and a heat blocking shade plate 38 formed of a disc is provided at the top of the column 37 in parallel to the diaphragm portion 36.

Figure 14:
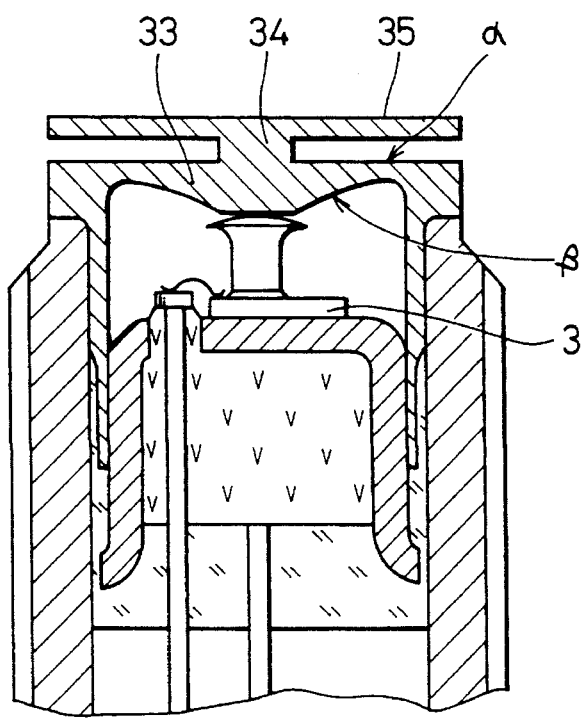
FIG. 14 is a sectional view showing another embodiment of a cup forming a diaphragm portion of the present invention.

Thereby, a synergetic effect of the deflection reducing effect by the diaphragm portion 1a having the crater portion 1b shown in FIG. 2 and of the deflection reducing effect by the heat blocking shade plate 35 shown in FIG. 14 may be obtained.

Still another embodiment will be explained with reference to FIG. 16.

In this pressure detector, the radial center portion of a diaphragm portion 39 itself is cratered toward the semiconductor device 3 in the axial direction similarly to the diaphragm portion 1a shown in FIG. 2. In the present embodiment, a shallow cup shape heat blocking can 40 made from SUS additionally covers a diaphragm portion 39. Inlets/outlets 41 for combustion gas are opened around the wall of the thin heat blocking can 40 to allow the combustion gas to act on the diaphragm portion 39. This heat blocking can 40 blocks the radiant heat energy radiated from the combustion gas from being received by the surface $\alpha$ of the diaphragm portion 39, similar to the heat blocking shade plates 35 and 38 shown in FIGS. 14 and 15 and brings about the same effect of adopting the structure shown in FIGS. 14 or 15.

Figure 17:
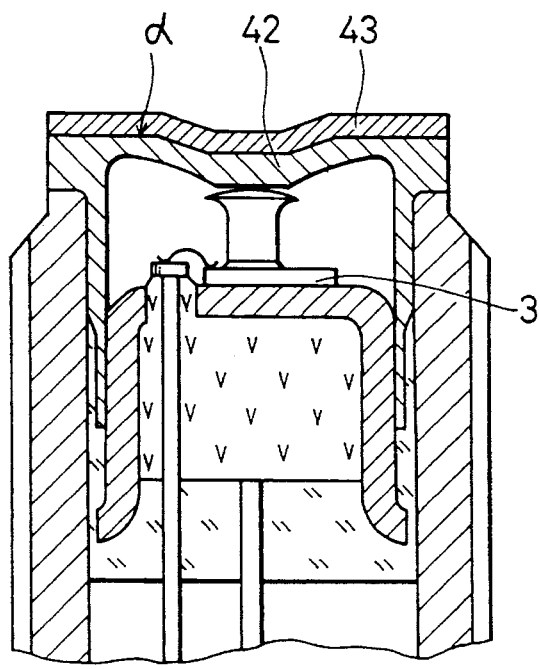
FIG. 17 is a sectional view showing still another embodiment of a cup forming a diaphragm portion of the present invention.

Still another embodiment will be explained with reference to FIG. 17.

In this pressure detector, the radial center portion of a diaphragm portion 42 itself is cratered toward the semiconductor device 3 in the axial direction similarly to the diaphragm portion 1a shown in FIG. 2. In the present embodiment, a heat blocking layer 43 is adhered on the surface $\alpha$ of the diaphragm portion 42 by ceramic flame coating of alumina for example.

Figure 15:
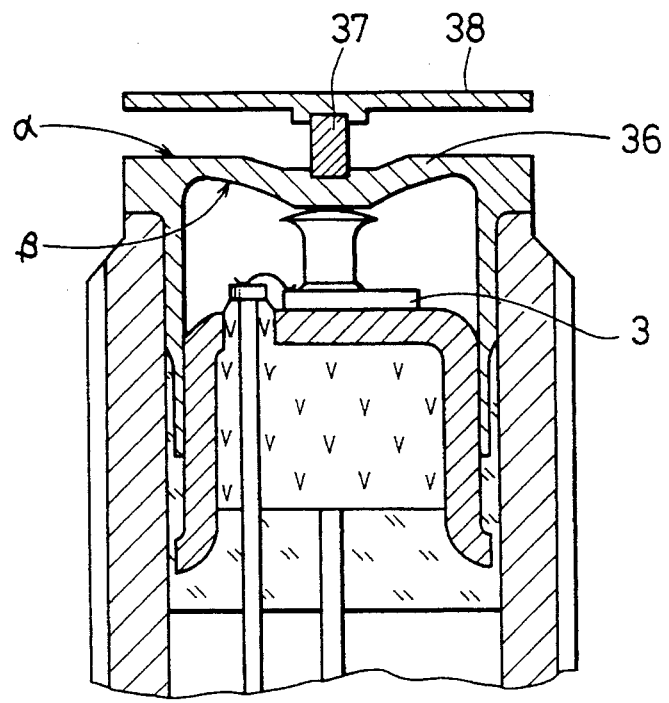
FIG. 15 is a sectional view showing still another embodiment of a cup forming a diaphragm portion of the present invention.
Figure 16:
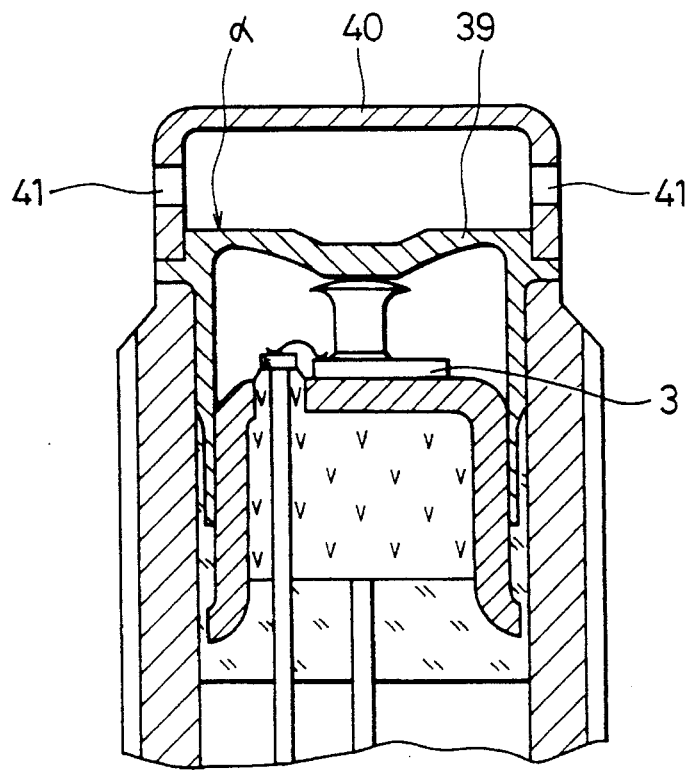
FIG. 16 is a sectional view showing still another embodiment of a cup forming a diaphragm portion of the present invention.

The heat blocking layer 43 blocks the radiant heat energy radiated from the combustion gas from being received by the surface $\alpha$ of the diaphragm portion 42 and brings about the same effect of adopting the structure shown in FIGS. 14, 15 or 16.

Next, the bonded state of the semiconductor device 3 with the stem 4 described above in FIG. 4 will be explained in detail.

Figure 5:
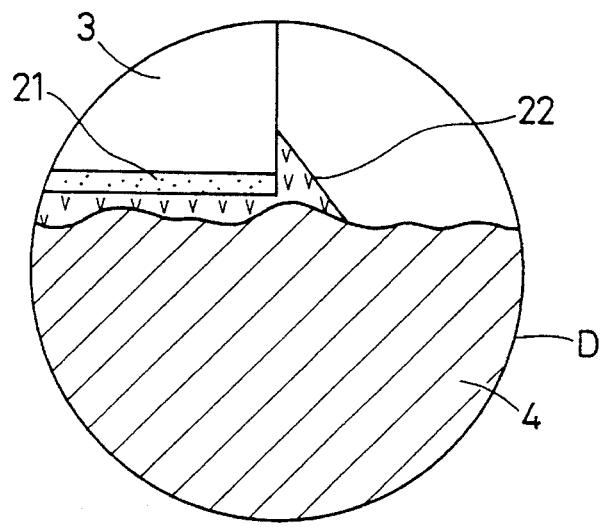
FIG. 5 is a partially enlarged view of a bonded state of end faces of the semiconductor device and the stem of the present invention.

It has been already described that the stem 4 electrically conducts with the engine block and becomes the (ground) since the housing 7 screwed into the engine block is electrically conducted with the stem 4 through the intermediary of the cup 1 forming the diaphragm portion 1a. At this time, there exists a small irregularity on the surface of the stem 4 as shown in FIGS. 4 and 5 and there is a possibility that the stem 4 partially contacts and conducts with the semiconductor device 3. In such a case, since the semiconductor device 3 directly receives the influence which the ground receives and fluctuates the sensor characteristics, an insulating film is formed on the whole back or bottom of the semiconductor device 3 by using the electrically insulating adhesive 22 to insulate the stem 4 from the semiconductor device 3.

However, there is a case when they are not completely insulated even if the insulating film is formed on the whole back of the semiconductor device 3. That is, there is a case when the electrically insulating adhesive 22 does not crawl up to the side of the semiconductor device 3 at the lower end face of the semiconductor device 3, thereby causing an interfacial leak on the side of the semiconductor device 3. Accordingly, the viscosity of the electrically insulating adhesive 22 is lowered in advance by means of heating or the like in order to reliably cause the electrically insulating adhesive 22 to crawl up on the side of the semiconductor device 3 in the present invention. Thus, the side of the semiconductor device 3 is coated by the crawl-up portion of the electrically insulating adhesive 22 as shown in FIG. 5 and the interfacial leak is completely prevented.

Although it is possible to prevent the interfacial leak from being generated without lowering the viscosity of the electrically insulating adhesive 22 by thickening the thickness of the insulating film to several tens μm, for example, it is apparent to lower the viscosity of the electrically insulating adhesive 22 considering the facts that heat radiation is lower and the time necessary for forming the film is increased.

Further, it is possible to insulate the stem 4 from the semiconductor device 3 without forming the insulating film on the whole back of the semiconductor device 3 by applying an insulating coating (not shown) on the surface of the stem 4 at least at the position where the semiconductor device 3 is disposed.

Thus the stem 4 is insulated completely from the semiconductor device 3 and the fluctuation of characteristics caused by the leak current may be eliminated.

Figure 18:
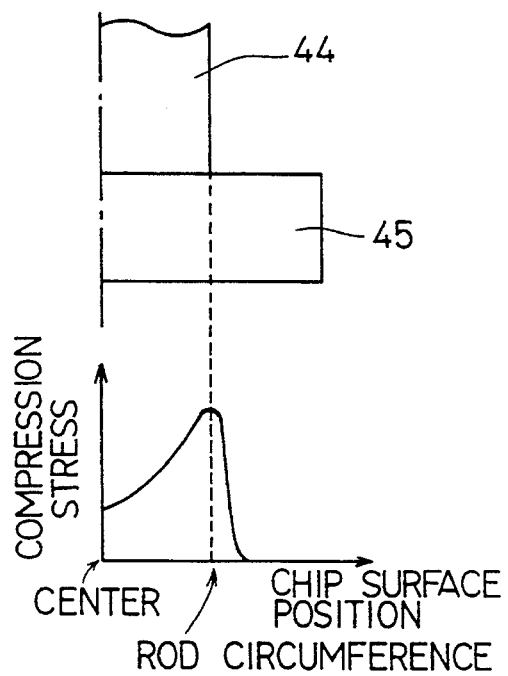
Figure 18:
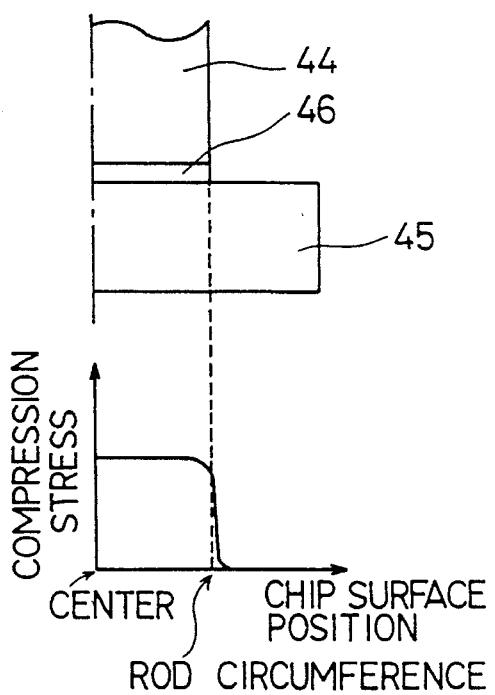

Next, the bonded state of the load transmission rod 2 and the semiconductor device 3 described in FIG. 6 will be explained in detail with reference to FIGS. 18(a), 18(b) and FIG. 19.

When a hard load transmission rod 44 is directly abutted to a hard semiconductor 45, normally a stress generated on the semiconductor 45 directly under the hard rod 44 is concentrated on the portion directly under the outer peripheral portion of the load transmission rod 44. FIG. 18(a) shows this situation wherein the strength of the semiconductor 45 drops. Then, the concentration of the stress is eliminated by interposing a soft member 46 as a buffer layer of the stress between the load transmission rod 44 and the semiconductor 45 as shown in FIG. 18(b).

However, since the interposition of the soft member 46 in the pressure transmission path causes a a pressure transmission loss, the resiliency of the soft member 46 has to be controlled in order to prevent a dispersion of sensitivity of the semiconductor 45. Accordingly, the elastic modulus and thickness which are the factors determining the resiliency of the soft member 46 have to be controlled to a desired value. However, since the adhesive used for bonding the semiconductor 45 with the load transmission rod 44 is liquid or gel, it is very difficult to control the thickness of the adhesive.

In the present embodiment, the control of the thickness of the buffer layer relies on the film 23 of a resin or glass having a small elastic modulus and low thermal conductivity and the resiliency of the buffer layer is skillfully controlled so that the compression force becomes a desired value by relaxing the concentration of the stress right below the outer peripheral portion of the load transmission rod 2.

Furthermore, it is possible to relax the concentration of stress right below the outer peripheral portion of the load transmission rod 2 more reliably by equalizing or increasing the area of the film 23 contacting with the pressure sensitive element 3 approximately equal to/more than the area of the pressurizing face (gauge section 19) of the load transmission rod 2 to the pressure sensitive element 3.

Accordingly, the concentration of the compression force on the surface of the pressure sensitive element 3 right below the load transmission rod 2 may be avoided and relaxed.

Therefore, a pressure may be detected in the state wherein there is no concentration of the pressure.

Furthermore, because the compression force is relaxed on the pressure sensitive element 3 and the strength of the Si substrate is maintained, the detector of the present invention may be used in a place having a relatively high pressure and its use range is expanded more than before.

Figure 19:
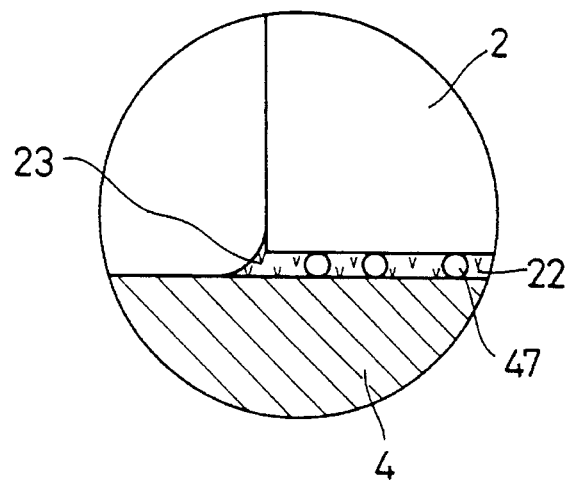
FIG. 19 is an enlarged view showing another embodiment of the buffer layer of the present invention.

While the buffer layer formed from the electrically insulating adhesive 22 and the film 23 has the function of relaxing the concentration of stress generated by the load as described above, it is possible to adopt a structure as shown in FIG. 19. That is, in FIG. 19, the electrically insulating adhesive 22 or low fusion point glass itself is used as the buffer layer without using the film 23. In this case, fillers 47 having an insulating quality such as glass, ceramics or resin are added within the electrically insulating adhesive 22 in order to assure the necessary thickness of the buffer layer.

Although the apparatus for outputting signals in response to a pressure has been shown as one example in the present embodiment, the way of generating the stress is not necessarily limited to the application of pressure and it is needless to say that it is possible to realize without departing from the spirit of the present embodiment even if it is a loading means which can transmit the stress to the pressure sensitive element 3 via the load transmission rod 2, e.g. loading means for transmitting the stress to the load transmission rod 2 by means of acceleration, magnetic force or electrostatic force.

Next, the operation effect when the stress from the load transmission rod 2 is transmitted to the semiconductor device 3 described in FIG. 8 will be explained in detail.

Considering only the stress in the pressurizing direction from the load transmission rod 2 as the stress which acts on the semiconductor device 3, i.e. as the stress which acts on the bridge resistors disposed in the gauge section 19 on the semiconductor device 3 right below the lower end of the load transmission rod 2, the piezoresistive effect on the (110) face may be expressed as follows:

$$\begin{bmatrix} E_{<100>} \\ E_{<110>} \end{bmatrix} = \rho \begin{bmatrix} 1 + \pi_{12}\rho_{zz} & 0 \\ 0 & 1 + \dfrac{\pi_{11} + \pi_{12} - \pi_{44}}{2} \sigma_{zz} \end{bmatrix} \quad (1)$$

$$\begin{bmatrix} i_{<100>} \\ i_{<110>} \end{bmatrix}$$

where E<100> and E<110> are electric fields, i<100> and i<110> are components in each crystal axial direction of current density, ρ is a resistivity, $\sigma_{zz}$ is a stress component in the perpendicular direction to the semiconductor surface (pressurizing direction from the rod) and $\pi_{11}$, $\pi_{12}$ and $\pi_{44}$ are piezoresistive coefficients to the main axis of the crystal.

Since $\pi_{11}$, $\pi_{12} << \pi_{44}$ in the normal P-type Si substrate, almost no piezoresistive effect is generated in one pair of piezoresistive elements disposed in the <100> direction and the maximum piezoresistive effect may be obtained from the other pair of piezoresistive elements disposed in the <110> direction. That is, the resistance in the <110> direction increases due to the compression force in the $\sigma_{zz}$ direction. Accordingly, it is important to dispose the piezoresistive elements respectively in the <100> and <110> directions to connect in the bridge form in order to utilize the piezoresistive effect most efficiently.

Then, in the present invention, a $\pi'_{13}$ gauge resistor whose resistance value changes in response to a compression force perpendicular to the surface of the semiconductor device 3 as the piezoresistive elements 25a through 25d to eliminate the influence of a width of contact electrode (not shown) at the output terminal and to improve the sensitivity. Furthermore, since all of the piezoresistive elements 25a through 25d formed into the bridge by the $\pi'_{13}$ gauge resistor are disposed within the gauge section 19 located in the semiconductor device 3 right below the lower end of the load transmission rod 2, the dispersion of the sensitivity may be reduced and the dispersion of temperature characteristics may be reduced.

As for the sensitivity at this time, it was confirmed that the gauge resistors 25a through 25d connected in the bridge form of the present embodiment can obtain a sensitivity of about 1.5 times of a square gauge resistor (not shown) according to a FEM effect implemented by the present inventors.

Accordingly, it becomes possible to obtain accurate temperature characteristics irrespective of the electrode width of the pressure sensitive element 3, without lowering the sensitivity even if the face where the compression force acts by the load transmission rod 2 is dislocated.

It has been also already explained in FIG. 8 that the resistors 26a and 26b for compensating the temperature of the bridge are disposed within the range of the lower end of the load transmission rod 2. The gauge resistors and the resistors for compensating temperature are disposed within the range of the lower end of the rod and are disposed around the center of the semiconductor device 3 as shown in FIG. 8. This location is selected because it has the least temperature gradient among the surface of the semiconductor device 3 in the surface bonded with the load transmission rod 2. The resistors 26a and 26b for compensating temperature are disposed in the same direction <100> of the crystal axis with the gauge resistors 25c and 25d. Accordingly, because the resistance values of the resistors 26a and 26b for compensating temperature will barely change in response to the stress, changes of amplification factor due to the pressure caused by its resistance may be suppressed.

Figure 20:
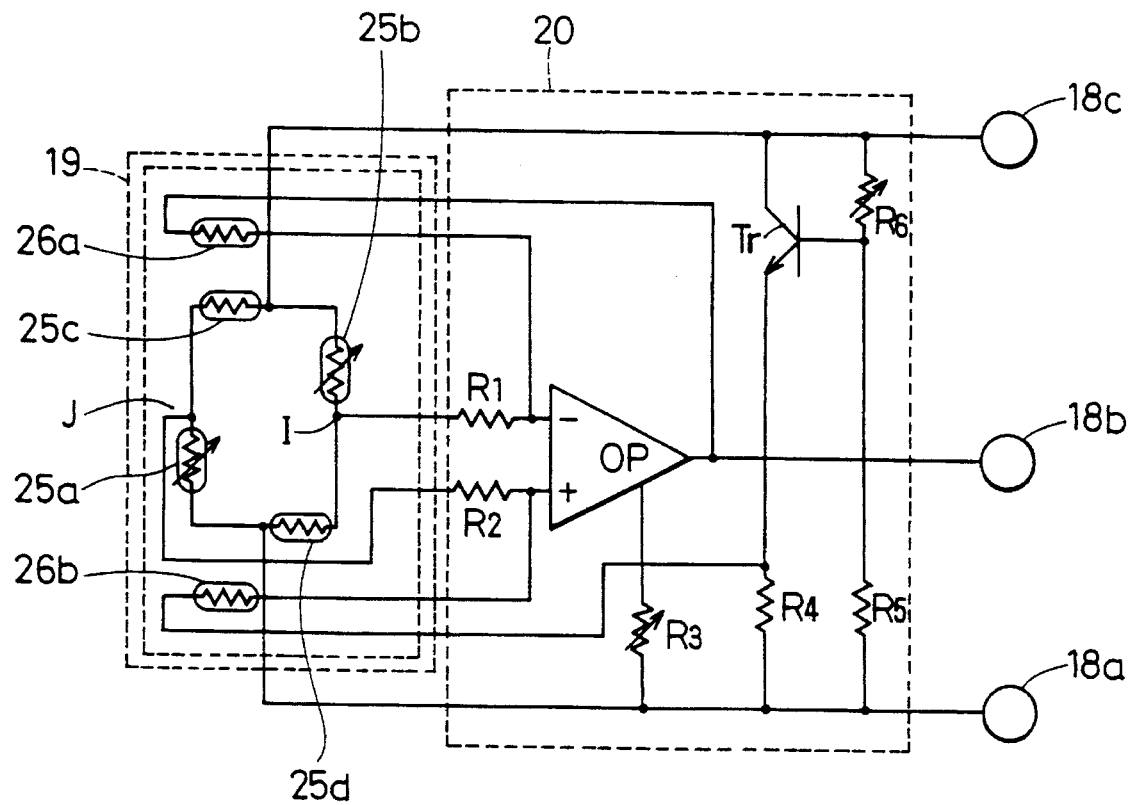
FIG. 20 is an electric circuit diagram of an equivalent circuit composed of a gauge section and amplifier circuit of the present invention.

FIG. 20 shows an equivalent circuit composed of the gauge section 19 in which each of the resistors 25a through 25d and 26a and 26d are disposed and of the amplifier circuit 20.

In FIG. 20, four piezoresistive elements 25a and 25d are bridge connected and a change of resistance values caused by the piezoresistive effect is detected as a voltage change. Then, an amplification factor of an operational amplifier OP is changed by the temperature compensating resistors 26a and 26b when the output voltage is amplified by the operational amplifier to compensate the change of the sensitivity due to the temperature characteristics of the piezoresistive elements 25a through 25d.

Here, because the temperature coefficient of the resistance value of the diffused resistors and that of the piezoresistive effect generally depend on impurity concentration, it is necessary to set the impurity concentration of each of the resistors 25a through 25d and 26a and 26b to adequate values in order to compensate as described above. Then, in the present embodiment, resistors having the same value are used for example for each of the resistors 25a through 25d and 26a and 26b and resistors having zero temperature coefficient are used for the resistors $R_1$ and $R_2$ which determine the amplification factor together with the temperature compensating resistors 26a and 26b.

A transistor Tr and resistors $R_4$, $R_5$ and $R_6$ form a constant voltage circuit for setting an imaginary GAD of the operational amplifier OP and a resistor $R_3$ is a resistor for adjusting offset of the operational amplifier. The resistors $R_5$ and $R_6$ are thin film resistors which are trimmed with laser on a wafer. The use of a plurality of operational amplifiers OP enables a highly accurate amplifier circuit to be formed.

Next, operation of the semiconductor device 3 shown in FIG. 9 will be explained in detail.

When an ignition noise or noise of a transceiver mixes into the engine block, such noise is transmitted to the load transmission rod 2 since the load transmission rod 2 is electrically conductive when it is formed of metal. At this time, because of the sealing film 28 in the GAD potential on the piezoresistive elements 25a through 25d as shown in FIG. 9, the noise is absorbed by a parasitic capacitance generated between the load transmission rod 2 and the sealing film 28. Thereby, an influence of the noise to the piezoresistive elements 25a through 25d is removed. Similarly, although the noise is also transmitted to the stem 4, it is absorbed by a parasitic capacitance generated between the stem and GAD since the potential of the P-type Si substrate 32 of the semiconductor device 3 is connected to GAD. Accordingly, the influence of noise on the piezoresistive elements 25a through 25d is removed and it becomes possible to suppress the characteristics from fluctuating by the noise.

Figure 21:
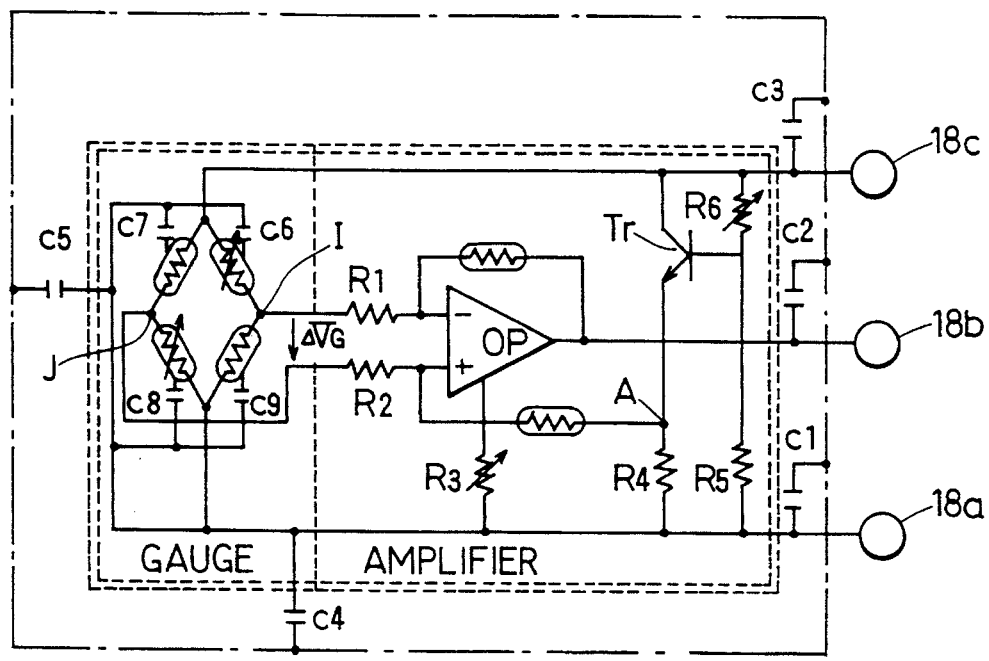
FIG. 21 shows the equivalent circuit when a parasitic capacitance is taken into account in the circuit in FIG. 20.

FIG. 21 shows an equivalent circuit in which the parasitic capacitance described above are additionally taken into account on the equivalent circuit shown in FIG. 20.

In FIG. 21, $C_1$, $C_2$ and $C_3$ are parasitic capacitance described above generated by an insulating member 46 between signal lines 18a, 18b and 18c which are the leads 6A, 6B and 6C and the stem 4. At this time, because each of the leads 6A, 6B and 6C is an output terminal whose gauge output is impedance converted by the operational amplifier OP or transistor Tr and the impedance of each signal line is less than 1 Ω, they receive no influence of the noise. The influence of the noise may be similarly prevented by adding a terminal for adjustment (not shown) whose output signal is not influenced or by adding a capacitance between the power source and GAD or between the output and GAD (not shown).

$C_4$ is a parasitic capacitance generated by the electrically insulating adhesive 22 and the electrically insulating film 21 between the stem 4 and the P-type Si substrate 32. Since it is connected to the GAD line, the influence of the noise to the piezoresistive elements 25a through 25d is eliminated.

$C_6$ through $C_9$ are parasitic capacitances generated between the piezoresistive elements 25a through 25d and $C_5$ is a parasitic capacitance generated between the sealing film 28 and the load transmission rod 2. Since the sealing film 28 is connected to the signal line having a low impedance, i.e. to GAD, the influence of the noise to the piezoresistive elements 25a through 25d is eliminated.

Since the load transmission rod 2 is made from an electrically conductive member, the sealing film 28 is provided on the gauge resistors 25a through 25d through the intermediary of the insulating films 30a and 30b, the sealing film 28 is not necessary if the load transmission rod 2 made from an insulating member is used.

Furthermore, although not shown, it is possible to thicken the insulating adhesive 22 on the gauge resistors 25a through 25d to produce a capacitance between the output terminal I of the bridge and GAD and the output terminal of the bridge and GAD, without using the sealing film 28 as described above.

Next, a manufacturing method of the present embodiment for assembling while adjusting the dispersion of the bridge outputs $V_I$ and $V_J$ will be explained in detail with reference to FIGS. 22 and 23.

Figure 22:
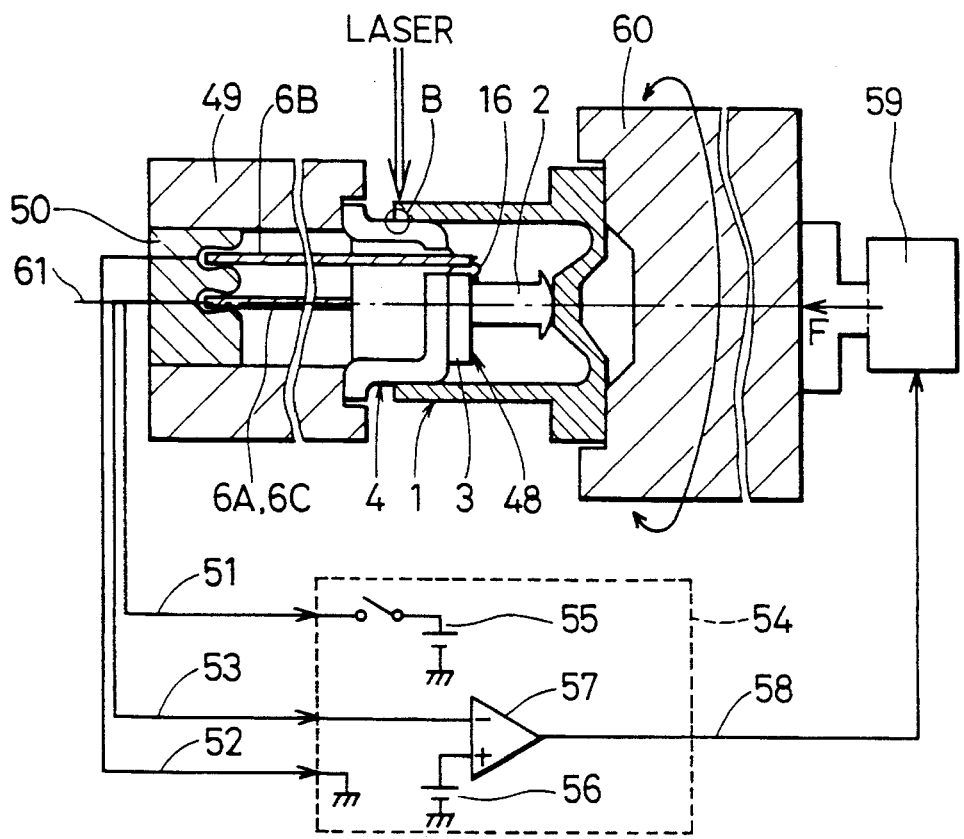
FIG. 22 is a schematic view of an assembly unit for setting a preset load of the present invention.

FIG. 22 is a schematic view of the whole assembling unit for setting a preset load per each product.

In FIG. 22, a sensor unit 48 including the semiconductor device 3, stem 4 and bonding wires 16 is set in a holding fixture 49 and the leads 6A, 6B and 6C are inserted to a socket 50 for taking out signals. A product power line 51 is connected to the lead 6A, a product GAD line 52 is connected to the lead 6B and a product output signal line 53 is connected to the lead 6C. Each of the lines is connected to a control unit 54.

The control unit 54 has a comparator 57 for comparing a voltage of a power source 55 for driving the product, a reference voltage 56 and an input voltage from the product output signal line 53 and outputting a load adjustment signal 58. When the load adjustment signal 58 is outputted from the control unit 54, a load generator 59 generates a load by receiving the adjustment signal and transmits the load to a preset load applying fixture 60. The preset load applying fixture 60 is set on the diaphragm portion 1a provided on the cup 1 which is set coaxially with the sensor unit 48 together with the load transmission rod 2. Thus the preset load applying fixture 60, diaphragm portion 1a and cup 1, load transmission rod 2, sensor unit 48, holding fixture 49 and socket 50 are all disposed on the same axis 61.

According to the assembly unit constructed as described above, the resistor $R_3$ is adjusted on the wafer of the semiconductor device 3 constructed as shown in FIG. 20 and the offset voltage of the operational amplifier OP becomes zero volts. The resistor $R_6$ is also so adjusted as to become zero point voltage (e.g. 1.2 V) when the gauge output $\Delta V_G = 0$ V. At this time, the gauge offset value is set at a minus voltage (e.g. −60 mV). FIG. 23 shows a relationship between the gauge output $\Delta V_G$ and the preset load F in this state.

Figure 23:
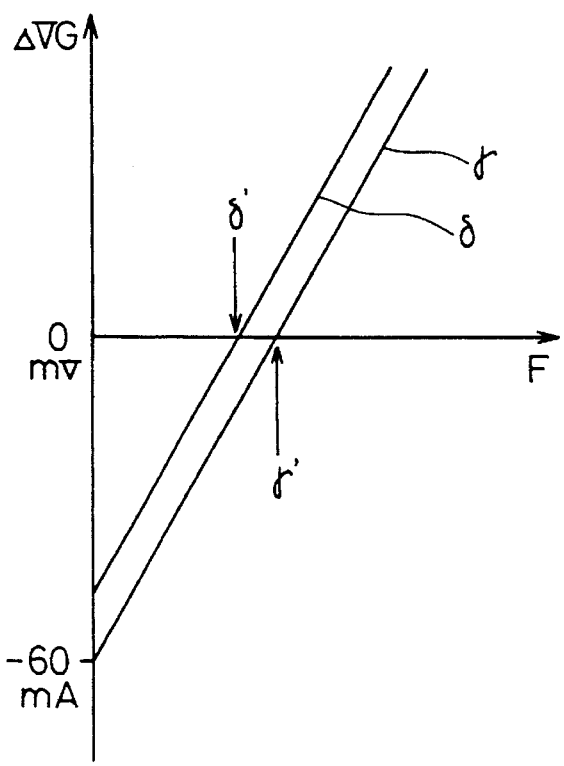
FIG. 23 is a graph showing a relationship of a gauge output $\Delta V_G$ with an applied load F.
Figure 24:
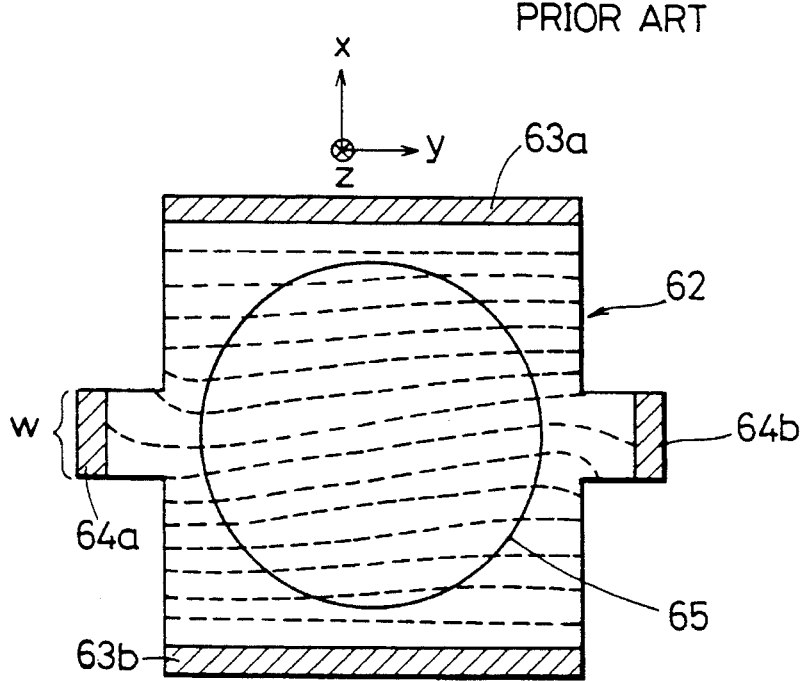
FIG. 24 is an explanatory view of a prior art pressure detector.
Figure 25:
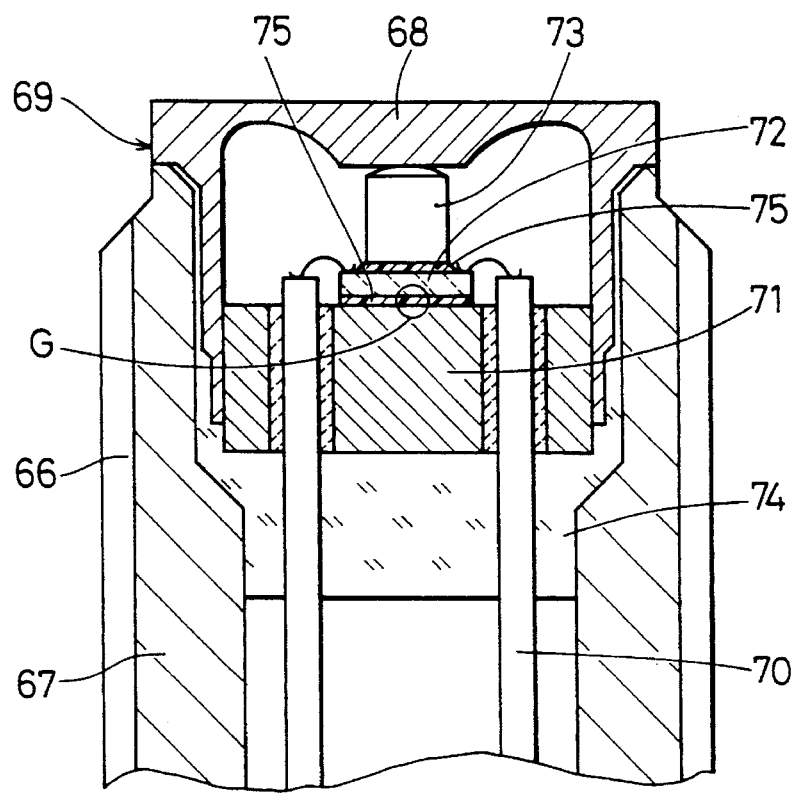
FIG. 25 is an explanatory view of another prior art pressure detector.
Figure 26:
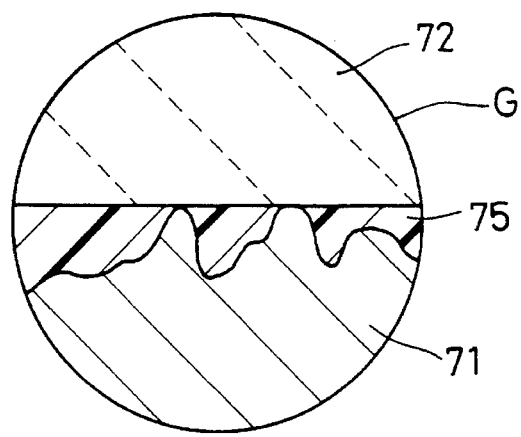
FIG. 26 is a partially enlarged view of portion G in FIG. 25.

In FIG. 23, the gauge output $\Delta V_G$ before the preset load applying fixture 60 is set on the diaphragm portion 1a disperses and when it presents values of sample γ and sample δ for example, the gauge output $\Delta V_G$ is set at 0 V by applying a preset load γ' to the sample γ and by applying a preset load δ' to the sample δ so that the sensor output becomes zero point voltage. Because the gauge offset voltage can be always set at 0 V, even when the gauge offset voltage thus disperses, the product receives no influence of the power source noise.

The dispersion of the zero point voltage of the sensor output may be thus prevented by causing the load to act on the semiconductor device 3 so that the output of the bridge circuit becomes zero volts and by maintaining this output.

Accordingly, because the stem 4 and the cup 1 are welded all around by irradiating a laser beam on the portion B shown in FIG. 2 while maintaining the state in which the constant preset load F is applied to the product by the load generator 59 and while rotating each of the members disposed on the same axis centering on an axis of rotation 61 in the same time, the product in which the dispersion of the bridge outputs $V_I$ and $V_J$ has been adjusted may be obtained.

The control in the control unit 54 may be implemented by a software by using a personal computer or the like.

Furthermore, it becomes possible to fully automate by adding the laser control and rotation control to the function of the control unit 54.

Although various embodiments have been elaborated in the pressure detector of the present invention, it is needless to say that various modifications can be made without departing from the spirit of the invention.

What is claimed is:

1. A pressure detector, comprising:

substrate means;

gauge resistor means formed on said substrate and whose resistance values change in response to a compression stress applied thereon;

temperature compensating resistor means formed on said substrate means for compensating a temperature of said gauge resistor means; and pressure transmission member means, bonded on said substrate means so that said gauge resistor means and said temperature compensating resistor means are located entirely within a bonded surface, for transmitting a pressure to be detected to said gauge resistor means as said compression stress.

2. The pressure detector according to claim 1, wherein each of said resistor means is within the bonded surface of said pressure transmission member means and is formed approximately at a radial center portion of said substrate means.

3. The pressure detector according to claim 1, wherein each of said resistor means has a line width and a line length which are in a range within the bonded surface of said pressure transmission member means.

4. The pressure detector according to claim 1, wherein said substrate means is made of a semiconductor whose face orientation is (110), a bridge circuit is formed by disposing a pair of resistors of said gauge resistor means in the direction of <110> of the crystal axis and by disposing another pair of resistors of said gauge resistor means in the direction of <100> of the crystal axis, and said temperature compensating resistor means are disposed in the direction of <100> of the crystal axis.

5. The pressure detector according to claim 4, wherein said pressure transmission member means includes:

a cup having a thin diaphragm portion movable with variations in said pressure; and a rod having one end connected to said diaphragm portion and another end connected to said substrate means.

6. The pressure detector according to claim 1, wherein a buffer layer for relaxing a concentration of stress at the bonded surface of said pressure transmission member is provided between said pressure transmission member and said substrate means.

7. The pressure detector according to claim 1, wherein said pressure transmission member means includes a rod.

8. The pressure detector according to claim 7, where said pressure transmission member means further includes a cup having a thin diaphragm portion movable within variations in said pressure, and said rod has one end connected to said diaphragm portion and another end connected to said substrate means.

9. A pressure detector, comprising:

substrate means having gauge resistors on a main surface thereof for outputting signals on the basis of changes of resistance values of said gauge resistors;

a pressure transmission member, disposed on the main surface of said substrate means, for transmitting a pressure to said gauge resistors;

an electrically conductive base means for disposing and fixing said substrate means thereon; and a signal transmission medium, sealed hermetically to said base means, for producing/receiving signals between said substrate means and an outside;

wherein said signal transmission medium is formed to transmit gauge output from said gauge resistors, an insulating film is formed on a back of said substrate means between said base means and said substrate means said substrate means is grounded, an electrically conductive sealing member is provided on said gauge resistors on said substrate means between said pressure transmission medium and said substrate means through an intermediary of an insulating film, said sealing member is grounded, and a buffer layer for relaxing a concentration of stress at the bonded surface of said pressure transmission member is provided between said pressure transmission member and said sealing member.

10. The pressure detector according to claim 9, wherein said substrate means, on the back of which said insulating film is formed, is fixed to said base means by an adhesive and said adhesive crawls up to the side of said substrate means at the lower end surface of said substrate means (FIG. 5).

11. The pressure detector according to claim 9, wherein said buffer layer is made of a film-like member.

12. The pressure detector according to claim 9, wherein said buffer layer is made from an adhesive containing fillers.

13. A pressure detector, comprising:

a substrate formed with piezoresistive elements thereon for producing a signal corresponding to a compressive stress applied thereto;

a first insulating film formed on said substrate to cover said piezoresistive elements;

an electrically conductive seal film formed on said first insulating film and electrically connected to a fixed electrical potential;

a second insulating film formed on said seal film;

a buffer means provided on said second insulating film; and a rod disposed on said buffer layer and which entirely covers said piezoresistive elements, said rod transmitting a pressure to be detected onto said piezoresistive elements as said compressive force through said layer and films.

14. The pressure detector according to claim 13, wherein said buffer means has a thickness sufficient to prevent electrical conduction between said rod and said piezoresistive elements.

* * * * *